(12) United States Patent
Deros et al.

(10) Patent No.: US 8,469,323 B1
(45) Date of Patent: Jun. 25, 2013

(54) MODULAR MONITOR SUPPORT ASSEMBLY

(76) Inventors: Yani Deros, Phoenix, AZ (US);
Matthew Ibarra, Lakewood, CA (US);
Jeff Mowry, Westcliffe, CO (US)

( * ) Notice: Subject to any disclaimer, the term of this patent is extended or adjusted under 35 U.S.C. 154(b) by 1039 days.

(21) Appl. No.: 12/106,891

(22) Filed: Apr. 21, 2008

(51) Int. Cl.
*E04G 3/00* (2006.01)

(52) U.S. Cl.
USPC ............... 248/278.1; 248/123.11; 248/124.2; 248/125.8; 248/276.1; 248/280.11; 248/292.13; 361/679.05; 361/679.06; 361/679.07; 361/679.21; 403/165

(58) Field of Classification Search
USPC .............. 248/122.1, 121, 917, 919, 921, 922, 248/280.11, 284.1, 276.1, 274.1, 278.1, 281.11, 248/282.1, 558, 248.1, 123.11, 123.2, 124.1, 248/124.2, 125.8, 131, 133, 154, 292.11, 248/292.13; 361/679.05–679.07, 679.21–679.22; 211/168, 170, 171, 182
See application file for complete search history.

(56) References Cited

U.S. PATENT DOCUMENTS

| | | | |
|---|---|---|---|
| 999,283 A * | 8/1911 | White ........................ 248/282.1 |
| 1,551,332 A | 8/1925 | Schramm | |
| 3,072,374 A | 1/1963 | Bodian | |
| 3,131,900 A * | 5/1964 | Anderson et al. ............ 248/210 |
| 3,322,886 A | 5/1967 | Warshawsky | |
| 3,424,419 A * | 1/1969 | Siegel ........................ 248/231.71 |
| 3,489,383 A * | 1/1970 | Anson ........................ 248/231.71 |
| 4,353,518 A | 10/1982 | Taylor et al. | |
| 4,437,638 A | 3/1984 | Scheibenpflug | |
| 4,459,650 A | 7/1984 | Pike | |
| 4,523,732 A * | 6/1985 | Biber et al. .............. 248/123.11 |
| 4,687,167 A * | 8/1987 | Skalka et al. ................ 248/126 |
| 4,695,024 A * | 9/1987 | Haven ..................... 248/281.11 |
| 4,708,312 A * | 11/1987 | Rohr ........................ 248/281.11 |
| 4,726,552 A * | 2/1988 | Warshawsky .............. 248/122.1 |
| 4,821,159 A | 4/1989 | Pike | |
| 4,852,842 A * | 8/1989 | O'Neill ..................... 248/284.1 |
| 4,880,193 A * | 11/1989 | Warshawsky .............. 248/122.1 |
| 5,123,621 A * | 6/1992 | Gates ....................... 248/281.11 |
| 5,379,205 A | 1/1995 | Peng | |
| 5,975,472 A * | 11/1999 | Hung ......................... 248/278.1 |
| 6,095,468 A * | 8/2000 | Chirico et al. ............. 248/282.1 |
| 6,134,103 A * | 10/2000 | Ghanma ................... 361/679.05 |
| D435,852 S | 1/2001 | Oddsen, Jr. | |
| 6,305,973 B1 * | 10/2001 | Rosen ........................... 439/534 |
| 6,409,134 B1 * | 6/2002 | Oddsen, Jr. ................ 248/274.1 |
| 6,478,275 B1 * | 11/2002 | Huang ....................... 248/284.1 |
| 6,601,811 B1 * | 8/2003 | Van Lieshout ............ 248/282.1 |
| 6,609,691 B2 * | 8/2003 | Oddsen, Jr. ................. 248/278.1 |
| 6,702,238 B1 * | 3/2004 | Wang ........................ 248/125.8 |
| 6,736,364 B2 * | 5/2004 | Oddsen, Jr. ................... 248/585 |
| 6,758,454 B2 * | 7/2004 | Smed ............................ 248/314 |
| 6,769,657 B1 * | 8/2004 | Huang ....................... 248/278.1 |

(Continued)

*Primary Examiner* — Terrell McKinnon
*Assistant Examiner* — Michael McDuffie
(74) *Attorney, Agent, or Firm* — Marian J. Furst

(57) ABSTRACT

A monitor support assembly having an internal cable raceway. The support assembly includes a pole mount that can be secured to a desk or table top or to a vertical wall or furniture panel, a rotatable knuckle joint at the upper end of the pole mount, and a quick-release mount for a monitor or other peripheral device. The assembly may also include nonarticulatable and vertical members, connected to each other and to the pole mount with knuckle joints that include internal sleeves. One or more cables, with plugs attached, can be inserted into the cable raceway and joints without disassembling the monitor support. The assembly may have interchangeable parts to provide different lengths for the nonarticulatable and vertical members.

25 Claims, 14 Drawing Sheets

U.S. PATENT DOCUMENTS

| | | | |
|---|---|---|---|
| 6,857,610 B1 * | 2/2005 | Conner et al. | 248/284.1 |
| 6,935,883 B2 * | 8/2005 | Oddsen, Jr. | 439/374 |
| 7,014,154 B2 | 3/2006 | Jeong et al. | |
| D520,017 S | 5/2006 | van Kuijk et al. | |
| 7,100,880 B2 * | 9/2006 | Oddsen, Jr. | 248/278.1 |
| 7,168,665 B2 * | 1/2007 | Hong et al. | 248/125.1 |
| 7,175,152 B2 * | 2/2007 | Dittmer | 248/221.11 |
| 7,195,214 B2 * | 3/2007 | Lee et al. | 248/125.8 |
| 7,195,215 B2 * | 3/2007 | Lin | 248/125.9 |
| 7,207,537 B2 * | 4/2007 | Hung | 248/284.1 |
| 7,237,755 B2 * | 7/2007 | Cho et al. | 248/274.1 |
| 7,264,212 B2 * | 9/2007 | Hung | 248/282.1 |
| 7,338,022 B2 * | 3/2008 | Hung et al. | 248/278.1 |
| 7,395,995 B2 * | 7/2008 | Chen | 248/284.1 |
| 7,510,155 B2 * | 3/2009 | Huang et al. | 248/278.1 |
| 7,513,473 B2 * | 4/2009 | Lu et al. | 248/276.1 |
| 7,546,994 B2 * | 6/2009 | Altonji et al. | 248/276.1 |
| 7,673,838 B2 * | 3/2010 | Oddsen et al. | 248/278.1 |
| 7,677,515 B2 * | 3/2010 | Oddsen et al. | 248/274.1 |
| 7,694,927 B2 * | 4/2010 | Chuang | 248/276.1 |
| 8,104,728 B2 * | 1/2012 | Chen | 248/286.1 |
| 2001/0023914 A1 * | 9/2001 | Oddsen, Jr. | 248/274.1 |
| 2002/0066843 A1 * | 6/2002 | Oddsen et al. | 248/282.1 |
| 2004/0262474 A1 * | 12/2004 | Boks et al. | 248/276.1 |
| 2006/0181637 A1 * | 8/2006 | Oddsen et al. | 348/373 |
| 2006/0273231 A1 * | 12/2006 | Huang | 248/371 |
| 2007/0040084 A1 * | 2/2007 | Sturman et al. | 248/280.11 |
| 2007/0102596 A1 * | 5/2007 | Sung | 248/122.1 |
| 2007/0176060 A1 * | 8/2007 | White et al. | 248/124.1 |
| 2007/0215776 A1 * | 9/2007 | Chen et al. | 248/404 |
| 2008/0029661 A1 * | 2/2008 | Chen | 248/176.1 |
| 2008/0067317 A1 * | 3/2008 | Altonji et al. | 248/604 |
| 2008/0164395 A1 * | 7/2008 | Chang et al. | 248/276.1 |

* cited by examiner

MODULAR MONITOR SUPPORT ASSEMBLY

FIELD OF THE INVENTION

The present invention relates generally to a monitor arm assembly for supporting a computer monitor, flat panel monitor, or other peripheral device, and more particularly to a monitor arm assembly having an internal raceway cable management system.

BACKGROUND OF THE INVENTION

Frequently it is desirable to position a computer monitor, other peripheral device, or notebook computer in a place other than directly on top of a desk or table. Thus, a variety of monitor arms exist that support a monitor in a position that is spaced apart from a desk top or wall. The monitor arms may be mounted to the desk top, such as with a clamp that engages the desk top and a vertical post that is inserted into the clamp. Alternatively, the monitor arms may be mounted to a wall or other vertical surface, such as with bolts, a rail system, or track mounts. Existing monitor arms may include multiple arm segments with hinged joints, allowing the user to adjust the arm through a wide range of positions for optimal viewing or usability. Many existing monitor arms also include a mechanism that allows the monitor to be raised and lowered to further optimize the monitor position.

In general, an electrical cable connects a monitor to a power source, and there may also be audio and/or data cable(s) connecting the monitor to a computer or network. It is undesirable to have the cable or cables hanging loose beside the monitor arm, and different solutions have been proposed to manage the cable or cables. For example, a cable may attached to the outside of the monitor arm, making it unsightly, or the cable may be retained least partly within the arm. However, these solutions are fraught with problems relating to managing the cable. While the monitor arm is moved and the arms are pivoted relative to each other, the cable may be stretched, kinked, pinched, worn, or otherwise damaged adjacent to the monitor arm joint or joints.

Therefore, there is a need for a monitor arm assembly with an integral, internal cable raceway. There is also a need for joints between monitor arm assembly segments with an internal passage for a monitor cable wherein the cable can remain without damage while the arm segments are positioned and re-positioned as desired. There is a further need for a monitor arm assembly with an integral, internal cable raceway that allows a cable and plug at the end of the cable to be inserted and removed easily without major disassembly of the monitor arm assembly segments or joints.

SUMMARY OF THE INVENTION

To achieve the foregoing and other objects and in accordance with the purpose of the present invention broadly described herein, one embodiment of this invention comprises a monitor support assembly having an internal cable raceway. The assembly comprises means for mounting the assembly to a desk, quick-release means for mounting a monitor to the assembly, and a first rotatable joint between the means for mounting and the quick-release means. The means for mounting and the joint include an internal passage through which at least one cable terminating in a connector or plug can pass without disassembly of the support assembly. The first joint provides rotational motion about the cables. The quick-release means is adapted for horizontal and vertical pivotal motion of the monitor.

The means for mounting may comprise a base including means for protecting and managing at least one cable passing through the base and for securing the base against a surface selected from a wall, a furniture panel system, and an upper surface of a desk. The means for protecting, managing, and securing may be selected from clamps and wire grommets. Further, the means for mounting may comprise inner and outer tubes sized for rotational and longitudinal movement of the inner tube within the outer tube; means for centralizing and retaining the inner tube within the outer tube; and additional quick-release means for locking and unlocking the inner tube in a desired position relative to the outer tube. The quick-release means may be adapted for mounting the monitor to the assembly in portrait and landscape orientations.

The monitor support assembly may further comprise components selected from nonarticulatable members, vertical members, additional rotatable joints between the components, and combinations thereof, with the components positioned between the first rotatable joint and the means for mounting. The additional components include a continuous internal passage sized such that at least one cable terminating in a connector or plug can be threaded therethrough. The nonarticulatable member preferably comprises a pair of opposing side plates, with each plate having a first end joined to one of the rotatable joints and a second end joined to either a second rotatable joint or the quick-release means. A portion of the internal passage is between the side plates. The nonarticulatable member may further comprise side and top covers secured to the plates, the joints, the quick-release means, or a combination thereof. The plates may be interchangeable with plates of different lengths to change the length of the nonarticulatable member. Preferably, the vertical member is pivotable horizontally about one of the joints and vertically relative to the means for mounting. The vertical member may comprise upper and lower links pivotably connecting one of the joints and either another joint or the quick-release means to provide vertical pivoting of the vertical member and the other joint or quick-release means relative to the joint. The upper and lower links may be interchangeable with links of different lengths to change the length of the vertical member. Preferably, the vertical member further comprises shock absorbers and a tension adjustment mechanism for the shock absorbers. The vertical member further comprises side and top covers secured to the side links, the joints, or a combination thereof.

Another embodiment of the present invention comprises a knuckle joint for a monitor arm assembly. The knuckle joint comprises an internal sleeve having an inner diameter sufficient to accommodate electrical and data cables that each terminate in a connector or plug. In addition, the joint comprises mating knuckle inserts disposed about the internal sleeve and mating knuckle portions clamped about the knuckle inserts. The mated knuckle portions form a recess above or below the internal sleeve with dimensions sufficient to accommodate electrical and data cables with plugs attached to the cables. The internal sleeve may be a telescopable tube of a means for mounting the monitor arm assembly to a desk. In this case, the mating knuckle inserts may comprise tabs engagable with openings in the tube. Alternatively, the internal sleeve may be a hollow bearing having a smooth external surface. In this case, the knuckle inserts comprise smooth internal surfaces rotatable about the external surface of the sleeve. The knuckle joint may further comprise a second set of mating knuckle inserts disposed about the internal sleeve above the set of mating knuckle inserts and a second set of mating knuckle portions clamped about the second set of knuckle inserts. In this case, the mating knuckle portions include a recess below the knuckle inserts and the sleeve, and the second set of mating knuckle portions include a recess above the second set of knuckle inserts and the internal sleeve. Thus, the sets of knuckle portions and the sleeve form a continuous conduit for the electrical and data cables. The knuckle joint may further comprise a friction washer between the mating knuckle inserts and the second set of mating knuckle inserts.

Yet another embodiment of the present invention comprises a monitor arm having an internal cable raceway. The monitor arm comprises two end sections and side links fastened to the end sections and forming a portion of the cable raceway within a space between the side links and the end sections. The side links have lengths selected to provide a pre-determined length for the monitor arm. The side links may comprise plates. Preferably, the side links are pivotally fastened to the end sections such that the end sections are pivotal in a vertical plane relative to the side links, and the monitor arm further comprises means for retaining the side links and the end sections in a selected position in the vertical plane. Preferably, at least one of the end sections comprises a knuckle joint having an internal sleeve with an inner diameter sufficient to accommodate electrical and data cables terminating in connectors or plugs. The joint also includes mating knuckle inserts disposed about the internal sleeve and mating knuckle portions clamped about the knuckle inserts. The mated knuckle portions each include a recess above or below the internal sleeve with dimensions sufficient to accommodate electrical and data cables terminating in connectors or plugs. One of the end sections may comprise quick-release means for mounting a monitor to the assembly. The quick-release means preferably comprises a quick-release clip engagable with the protruding portion to maintain the monitor mount in a mated configuration with the protruding portion, horizontally and vertically pivotal members attached to the end section, and a protruding portion on one of the horizontal and vertical pivotal members that is matable with a monitor mount.

Still another embodiment of the present invention comprises an assembly for mounting a peripheral device to a monitor arm. The assembly comprises horizontally and vertically pivotal members. One of the members is pivotally attached to the monitor arm, and the other member includes a protruding portion matable with a monitor mount. The assembly further comprises a quick-release clip engageable with the protruding portion to maintain the monitor mount in a mated configuration with the protruding portion. Preferably, the protruding portion and the quick-release clip are engageable when the monitor mount is rotated about the protruding portion into one of a plurality of positions. More preferably, the monitor mount is positionable so that an attached monitor or other peripheral device has either a landscape or portrait orientation.

BRIEF DESCRIPTION OF THE DRAWINGS

These and other features, aspects, and advantages of the present invention will become better understood with reference to the following description, appended claims, and accompanying drawings, where:

DESCRIPTION OF THE INVENTION

The present invention provides a monitor arm assembly suitable for holding a computer monitor or other computer peripheral device or a laptop computer. The arm includes an internal cable raceway that accommodates power and/or data cables, and the cables can be inserted and removed from the arm without dismounting the arm or major disassembly of the arm. In one embodiment the cables connecting the monitor to a computer or other device pass from the monitor into an internal raceway within a first, vertically adjustable arm segment. They are retained internally within the joints between the first arm segment and a second arm segment, within each arm segment, and between the second arm segment and a pole mount that secures the arm to a desk or table top. The arm segments can be rotated and repositioned repeatedly at the joints without damaging the cables. Further, the monitor arm assembly is modular, allowing customized combinations of interchangeable parts to meet the needs of specific installations.

For simplicity, the following discussion will refer to a monitor, but the device mounted onto the arm could be any peripheral device having one or more electrical or data cables connecting it to another device. Also for simplicity, directional or positional terms, such as "vertical," "horizontal," "top," "upper," "bottom," and "lower," refer to the orientations shown in the figures. The configuration and use of the present invention are not constrained by these orientations. In other words, the arm could be positioned so that the joint axes and pole mount are not vertical.

Figure 1:
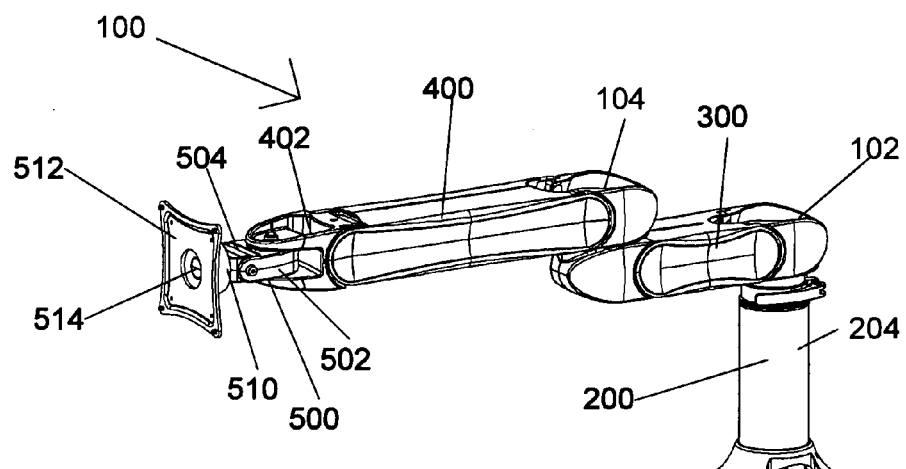
FIG. 1 is a front perspective view of one embodiment of a monitor arm assembly in accordance with the present invention.

One embodiment of the present invention is shown in FIG. 1. Arm 100 comprises multiple segments, shown as telescoping pole mount 200, nonarticulatable member 300, vertical member 400, and monitor mount 500. The knuckle joint 102 between pole mount 200 and nonarticulatable member 300 fixes the nonarticulatable member 300 to inner telescoping tube 202 (shown in FIGS. 3 and 4) of the pole mount 200. Inner tube 202 is rotatable with respect to a second, outer tube 204. The knuckle joint 104 between the nonarticulatable member 300 and the vertical member 400 allows the arms 300 and 400 to rotate relative to each other horizontally about a bearing sleeve (shown in FIGS. 10-15). Vertical member 400 terminates, at its distal end relative to the pole mount, in an end link 402 to which a monitor mount 500 is attached for joining a monitor or other peripheral device to arm 100. As shown, end link 402 is joined to a monitor head pivot 502 which, in combination with yoke 504 provides for pivotal rotation of monitor mount 500 relative to vertical member about horizontal and vertical and horizontal pins, as described below. Thus, monitor mount 500 and an attached monitor can be positioned as desired. Power and/or data cables (not shown) can be inserted into raceway segments within the vertical member 400, knuckle joint 104, nonarticulatable member 300, knuckle joint 102, and pole mount 200. The arms are positionable and repositionable without kinking, stretching, or causing excessive wear to any cables passing through the arms and joints.

Pole Mount

Figure 2:
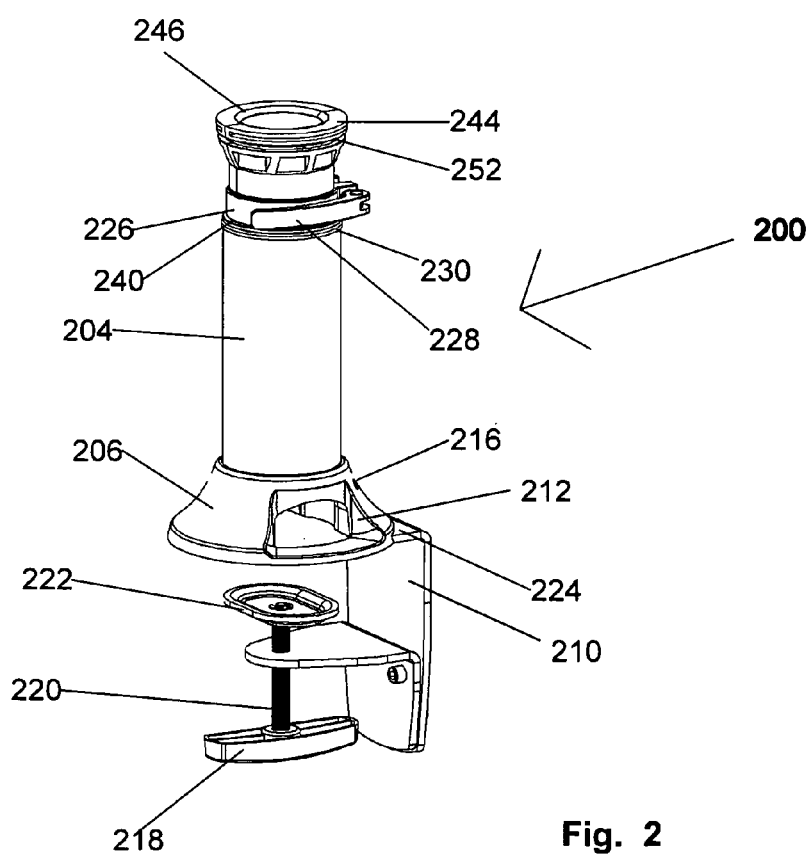
FIG. 2 is a front perspective view of a pole mount of the monitor arm assembly of FIG. 1.
Figures 3, 4:
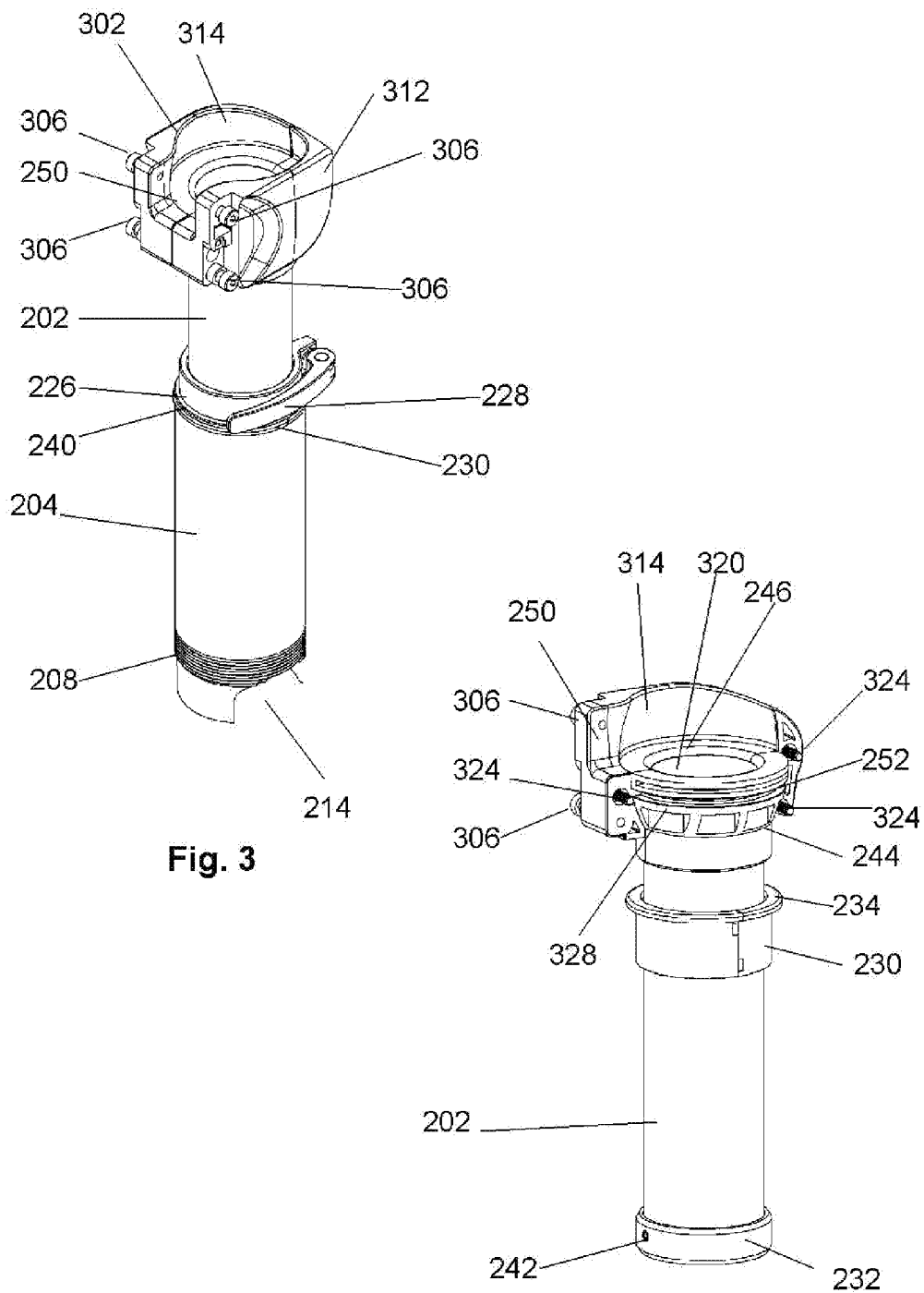
FIG. 3 is a front perspective view of the pole mount of FIG. 2 with the base removed and a knuckle joint included.
FIG. 4 is a front perspective view of a portion of the pole mount of FIG. 3.

As shown in FIGS. 2-4, one embodiment of a pole mount 200 in accordance with the present invention comprises telescoping inner and outer tubes 202 and 204, respectively. Base 206 is attached to the lower end of outer tube 204, such as with mating inner and outer screw threads 208. Base 206 is secured to clamp 210 and includes one or more openings 212 through which the ends of power or data cables may be threaded for connection to an appropriate power or data receptacle. Tube 204 also includes two indentations 214 at its lower edge to accommodate cables exiting the tube. Set screws 216 allow relative positioning of outer tube 204 and base 206 such that the openings 212 and indentations 214 can be aligned with each other and positioned as desired, for example, to provide the most direct access to receptacles into which the cable ends are plugged. Knob 218, attached bolt 220, and bit 222 are rotatable to adjust the spacing between the upper plate 224 of clamp 210 and bit 222 to secure the pole mount onto a desk or table top. Collar 226 with quick release lever 228 provides for rapid and easy adjustment of the height of the top of pole mount 200 relative to the desk or table top to which it is mounted as well as rotation of inner tube 202 inside outer tube 204. Collar 226 clamps about inner tube 202 and limits downward motion of inner tube 202 while allowing rotation of inner tube 202 inside outer tube 204.

Figure 5:
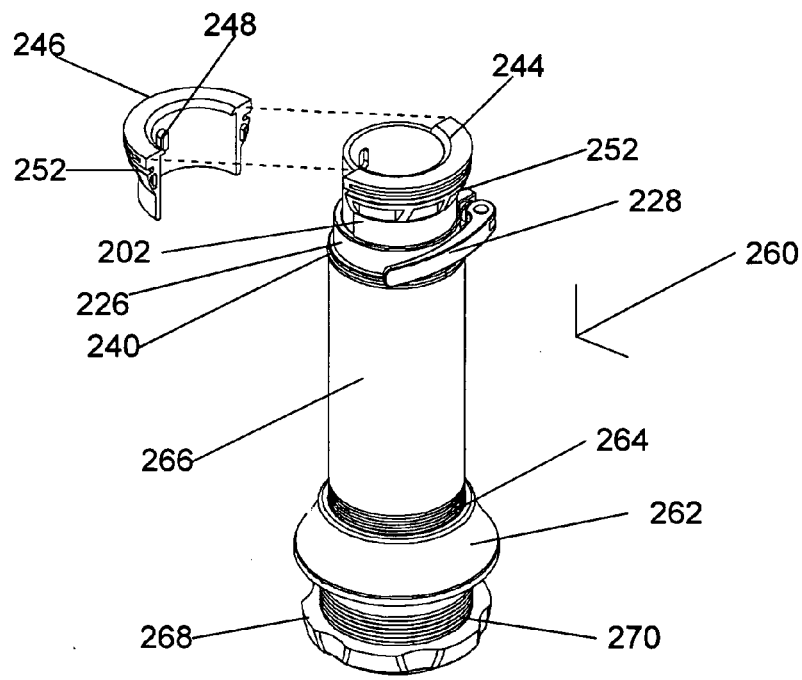
FIG. 5 is a front perspective view of another embodiment of a pole mount in accordance with the present invention.

FIG. 2 shows inner tube 202 fully retracted into outer tube 204, and FIG. 3 shows inner tube 202 extended partially out of outer tube 204. Upper tube bearing 230 and lower tube bearing 232 center inner tube 202 axially inside outer tube 204 as well as allowing the tubes 202 and 204 to rotate relative to one another and allowing inner tube 202 to slide vertically with respect to outer tube 204. Upper and lower tube bearings 230 and 232 also limit the vertical motion of inner tube 202 relative to outer tube 204. Upper tube bearing 230 comprises two mating portions with flanges 234 that rest upon the upper edge of outer tube 204 and are fixed to outer tube 204 with a set screw (not shown). Collar 226 rests upon washer 240 and upper tube bearing 230, and the upper surface of upper tube bearing 230 is a bearing surface on which collar 226 rests. Quick release lever 228 functions to release collar 226 to allow vertical and rotational adjustment of inner tube 202 and to lock collar 226 about inner tube 202 to maintain the adjusted position. Lower tube bearing 232 is held onto the lower end of inner tube 202 with a recessed set screw 242. As best seen in FIGS. 2, 4, and 5, knuckle inserts 244 and 246 are seated at the upper end of inner tube 202, with tabs 248 extending into slots 250 in inner tube 202. Knuckle inserts 244 and 246 form part of joint 102 between pole mount 200 and nonarticulatable member 300, as discussed below.

As shown in FIG. 5, a pole mount 260 may be used with a wire grommet to pass the ends of the enclosed power and data cables through a desk or table top. Internally threaded grommet base 262 is matable with the upper threaded portion 264 of outer tube 266, and internally threaded grommet nut 268 is matable with the lower threaded portion 270 of outer tube 266 to sandwich the desk top. Other parts of pole mount 260 may be the same as parts of pole mount 200 and are labeled identically. Alternatively and not shown, a pole mount in accordance with the present invention could be mounted to a vertical structure, such as a wall or furniture panel.

Nonarticulatable Member

Figure 6:
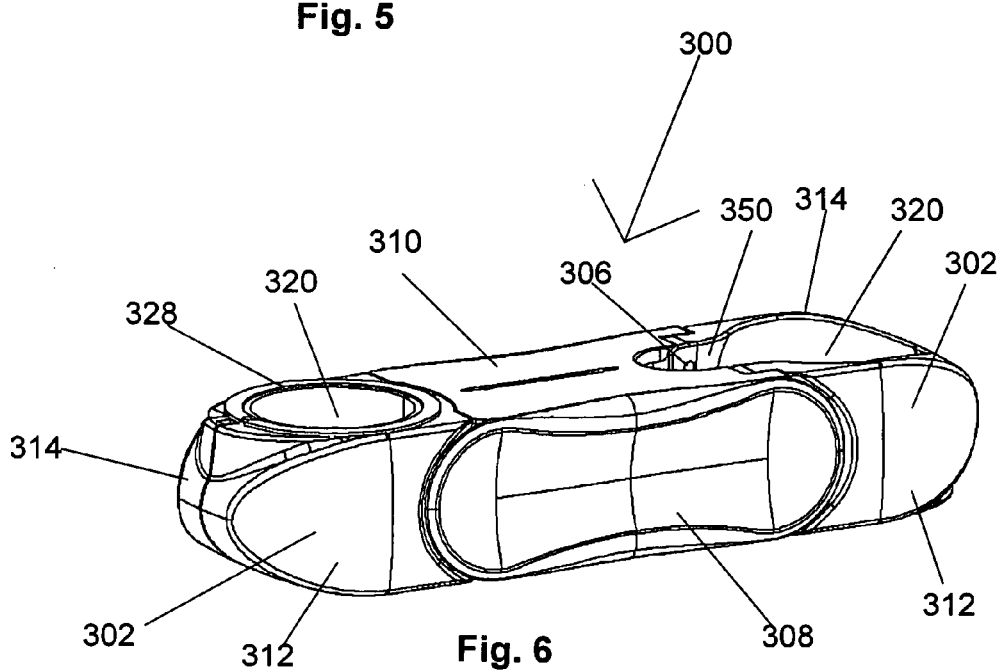
FIG. 6 is a front perspective view of one embodiment of a nonarticulatable member in accordance with the present invention.
Figure 7:
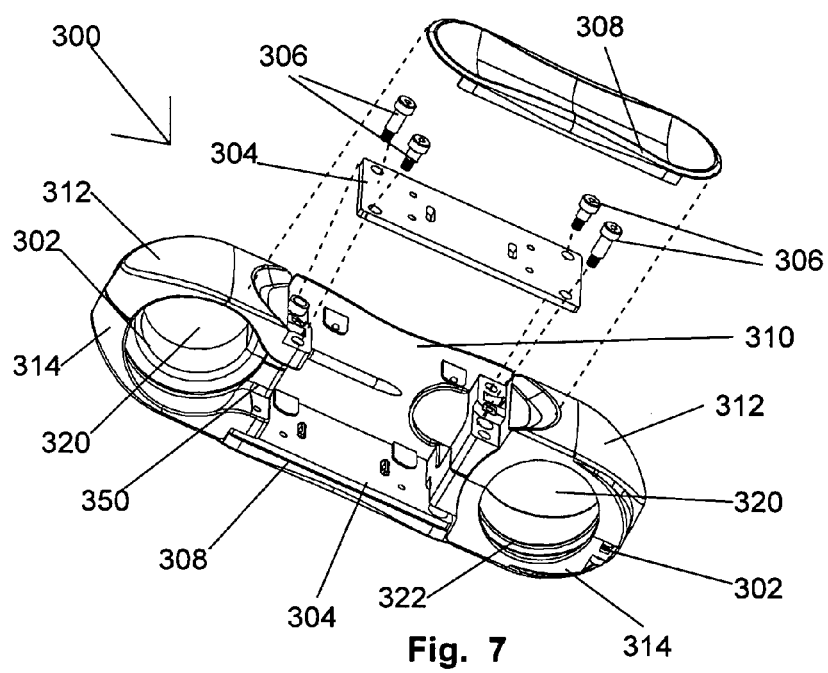
FIG. 7 is an exploded bottom perspective view of the nonarticulatable member of FIG. 6.
Figure 8:
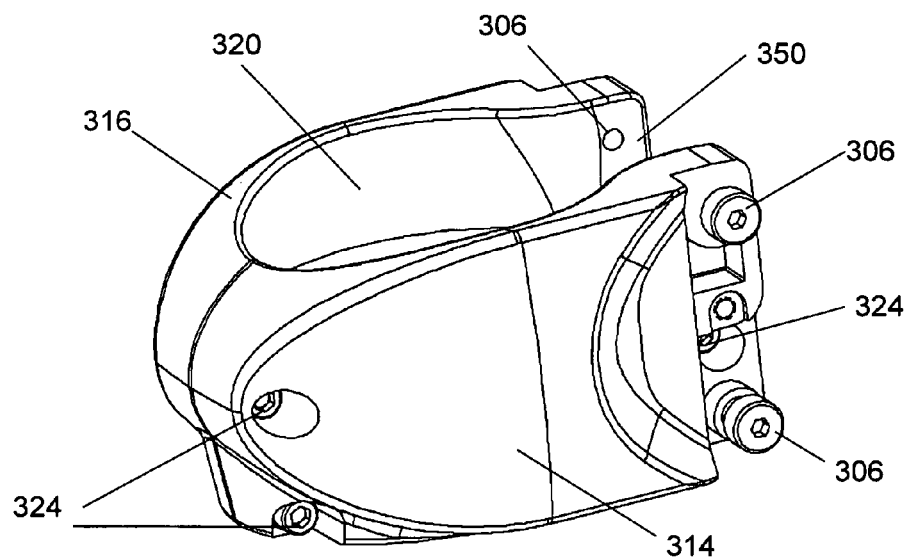
FIG. 8 is a front perspective view of one embodiment of a knuckle joint in accordance with the present invention.

As shown in detail in FIGS. 1, 6, and 7, nonarticulatable member 300 includes two knuckles 302 and two side plates 304. Each side plate 304 is joined to both knuckles 302 by fasteners, such as alien screws 306, defining an interior space that serves as part of the cable raceway. Two side covers 308 and a top cover 310 snap-fit onto the plates to provide an esthetically pleasing appearance and hide any cables present within the raceway.

The two knuckles 302 of the nonarticulatable member 300 are identical but rotated 180 degrees relative to each other. Knuckles 302 clamp either knuckle inserts 244 and 246 about the upper end of inner tube 202 of pole mount 200 or 260, or they clamp knuckle inserts 330 (shown in FIG. 10) about bearing sleeve 316 and between bearing sleeve lips 318, shown in FIGS. 10-14. Knuckle 319 comprises two matable portions 312 and 314, which are mirror images of each other. When mated, portions 312 and 314 define a substantially cylindrical opening 320, with flange 322 extending inward into the cylindrical opening 320. Each knuckle portion 312 and 314 includes openings that accommodate fasteners 324 for holding the two portions together. In addition, each knuckle portion includes openings that accommodate fasteners 306 for joining plates 304 to the knuckle portions.

Groove 326 in the exterior surface of each knuckle insert 244 or 246 accommodates flanges 322 of the matable knuckle portions 312 and 314. Knuckle inserts 244 and 246 include pins (not shown) that engage slots 250 in the inner tube 202 of pole mount 200 or 260, as shown in FIG. 5. Thus, the knuckle inserts are not rotatable independently of inner tube 202.

Further, matable knuckle portions 312 and 314 engage the external surfaces of knuckle inserts 244 and 246 with sufficient friction that arm 300, knuckle inserts 244 and 246, and inner tube 202 rotate as a unit. Matable knuckle portions 312 and 314 extend above the knuckle inserts 244 and 246, with recess 350 providing a passage for cables between the interior of nonarticulatable member 300 and the interior of inner tube 202 of pole mount 200 or 260.

Knuckle inserts 330 and 332 are similar to knuckle inserts 244 and 246, except that they do not have pins extending inward. Rather, they have a smooth, cylindrical inside surface that rotates easily about bearing sleeve 316. Groove 326 engages flanges 322 of matable knuckle portions 312 and 314 in the same manner as groove 252. Joint 104 between nonarticulatable member 300 and vertical member 400 may, optionally, include a friction washer 328 between the paired knuckle portions of nonarticulatable member 300 and the paired knuckle portions of vertical member 400.

Vertical Member

Figure 13:
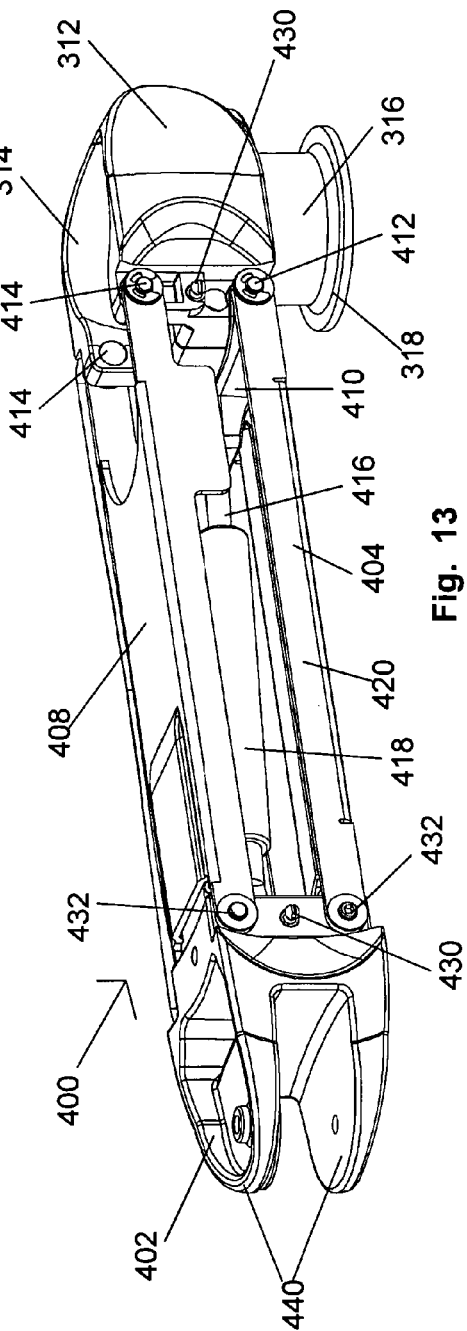
FIG. 13 is a front perspective view of the vertical member of FIG. 11, with the top and side covers and the monitor mount removed.
Figure 12:
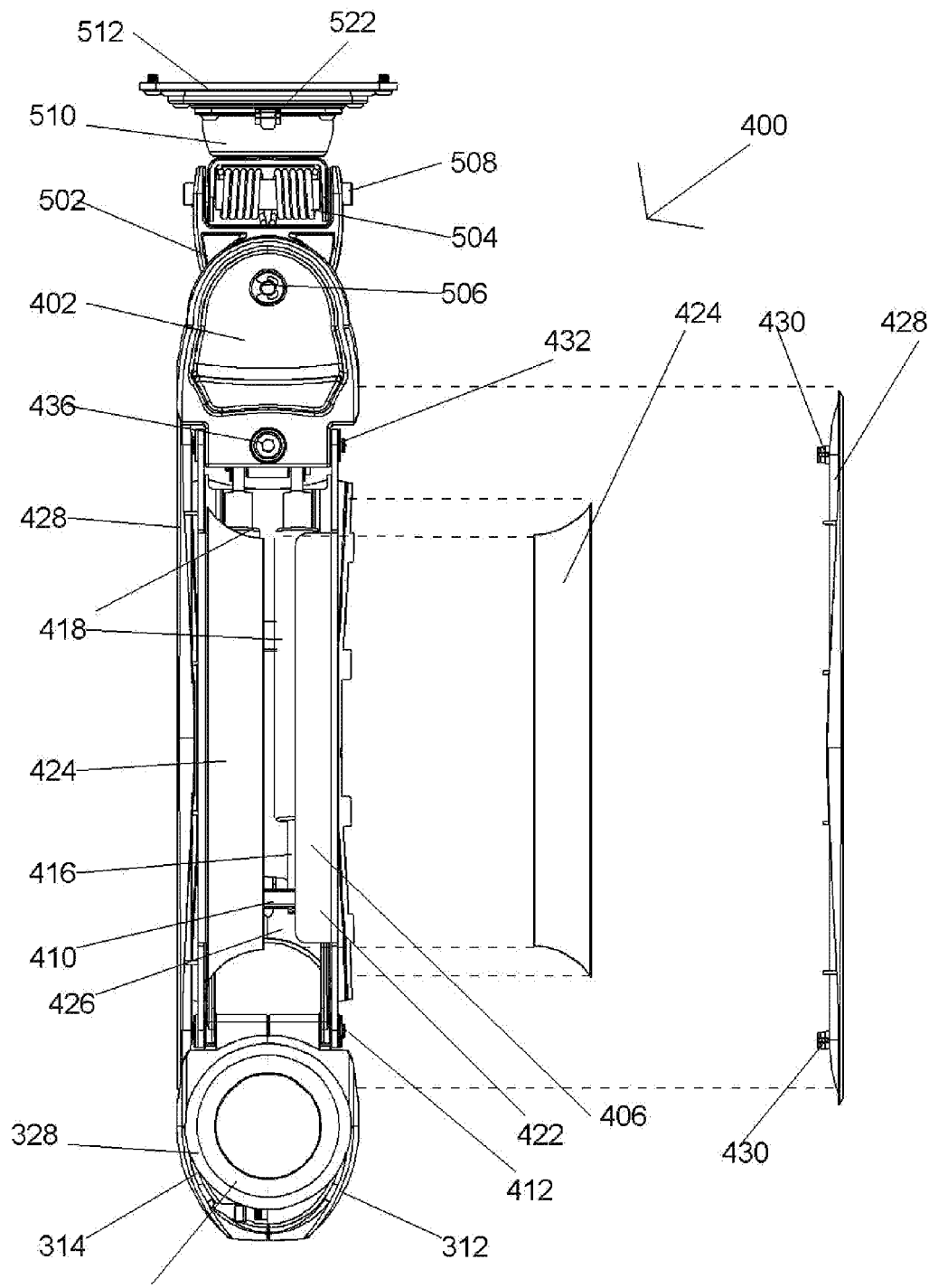
FIG. 12 is a partially exploded bottom view of the vertical member of FIG. 11.
Figure 14:
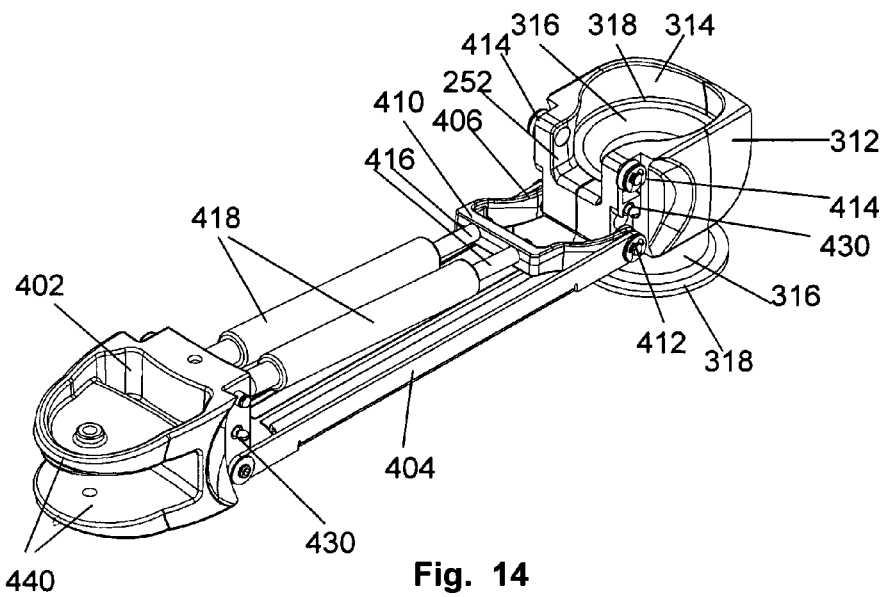
FIG. 14 is a front perspective view of the vertical member of FIG. 13, with additional components removed.
Figure 15:
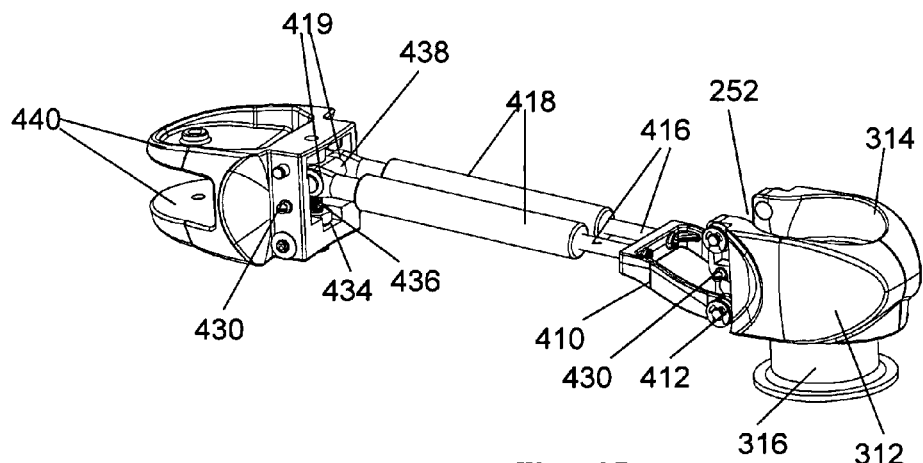
FIG. 15 is another front perspective view of the vertical member of FIG. 13.
Figure 16:
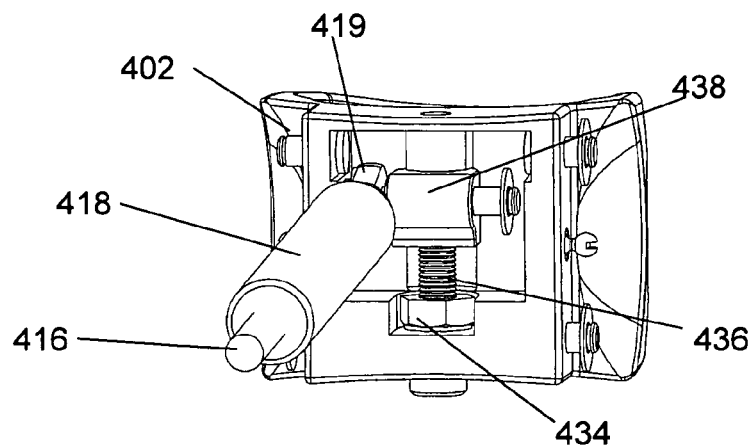
FIG. 16 is a perspective view of a detail of the vertical member of FIG. 13.

Referring to FIGS. 1 and 11-15, vertical member 400 comprises a parallelopiped structure formed by lower links 404 and 406 and upper link 408 pivotably joined to end link 402 and matable knuckle portions 312 and 314. Clevis 410 fits between the ends of the lower links 404 and 406 and is pivotably secured to knuckle joint 104 with a clevis pin 412. The end of upper link 408 is joined to matable knuckle portions 312 and 314 with pivot pins 414 and secured in place, such as with washers and E clips, or any other means known in the art. As illustrated in FIGS. 13-14, clevis pin 412 and pivot pins 414 can be inserted into the same openings in knuckle portions 312 and 314 as the allen screw fasteners 306. Two adjustable gas shocks 416 are joined to clevis 410 and cooperate with gas-filled shock absorber cylinders 418 to maintain arm 400 at a desired position. As shown in FIG. 15, cylinders 418 with eyelets 419 are mounted to a tension adjusting mechanism, described below, on end link 402. Lower links 404 and 406 each have a vertical portion 420 and a horizontal portion 422 extending toward the inside of the arm. Wire flaps 424 (FIG. 12) are slid onto the horizontal portions of lower links 404 and 406. Arm 400 further comprises a top cover 426 and side covers 428 that snap-fit onto end link 402 and matable knuckle portions 312 and 314, such as with pips 430. Alternatively and not shown, the covers may be screwed or otherwise fastened onto the end link and matable knuckle portions. In combination with the end link and the matable knuckle portions, the top cover, side covers, and wire flaps provide an enclosure that forms a part of the internal cable raceway and protects people from pinching fingers, etc. when the arm is moved.

End link 402 includes openings to accommodate pins 432 upon which the ends of lower links 404 and 406 and upper link 408 are pivotable. A nut 434 retains tension screw 436 in an opening at the bottom of end link 402. The ends of gas shock pistons 416 are pivotably attached to an elevator nut 438 on tension screw 436. Rotating the tension screw 436 adjusts the tension on the shock absorbers so that the vertical member can easily be positioned as desired, yet remain in position during use. End link 402 also includes brackets 440 that include openings to retain the ends of vertical pivot pin 506.

Figure 17:
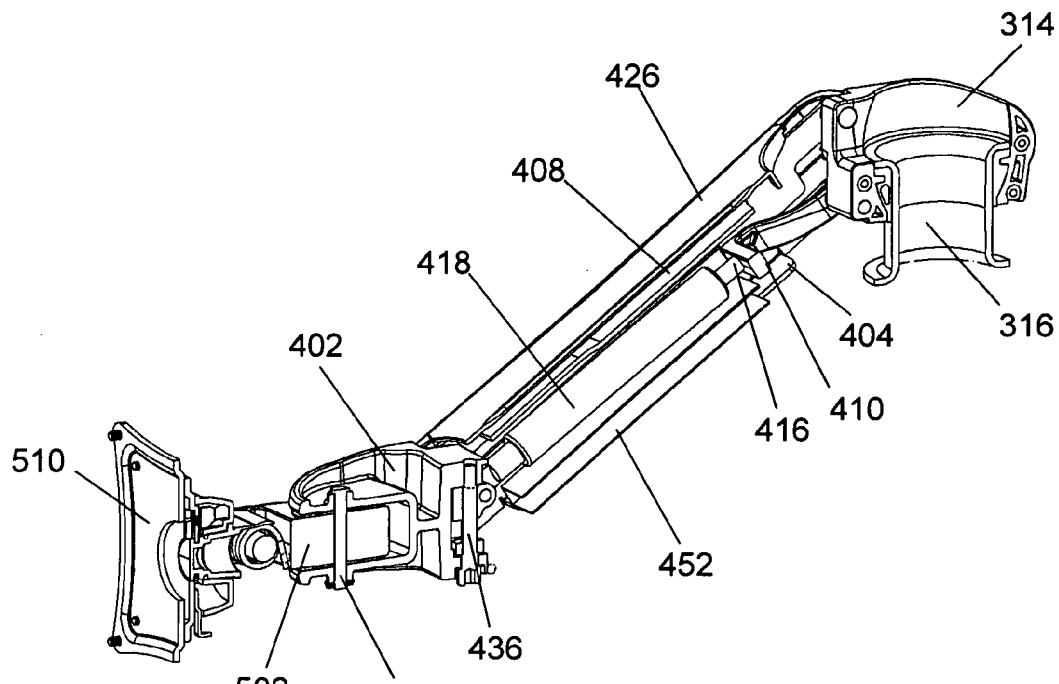
FIG. 17 is a front perspective view of a cross section of another embodiment of a vertical member in accordance with the present invention.

Another embodiment 450 of a vertical member in accordance with the present invention is shown in cross section in FIG. 17. Cable sheath 452 sits between the side links 404 and the gas shocks 416 and shock absorber cylinders 418. The bottom of sheath 452 includes a longitudinal slot through which one or more cables can be inserted. All other components of cable sheath 452 are the same as those of cable sheath 400.

Figure 18:
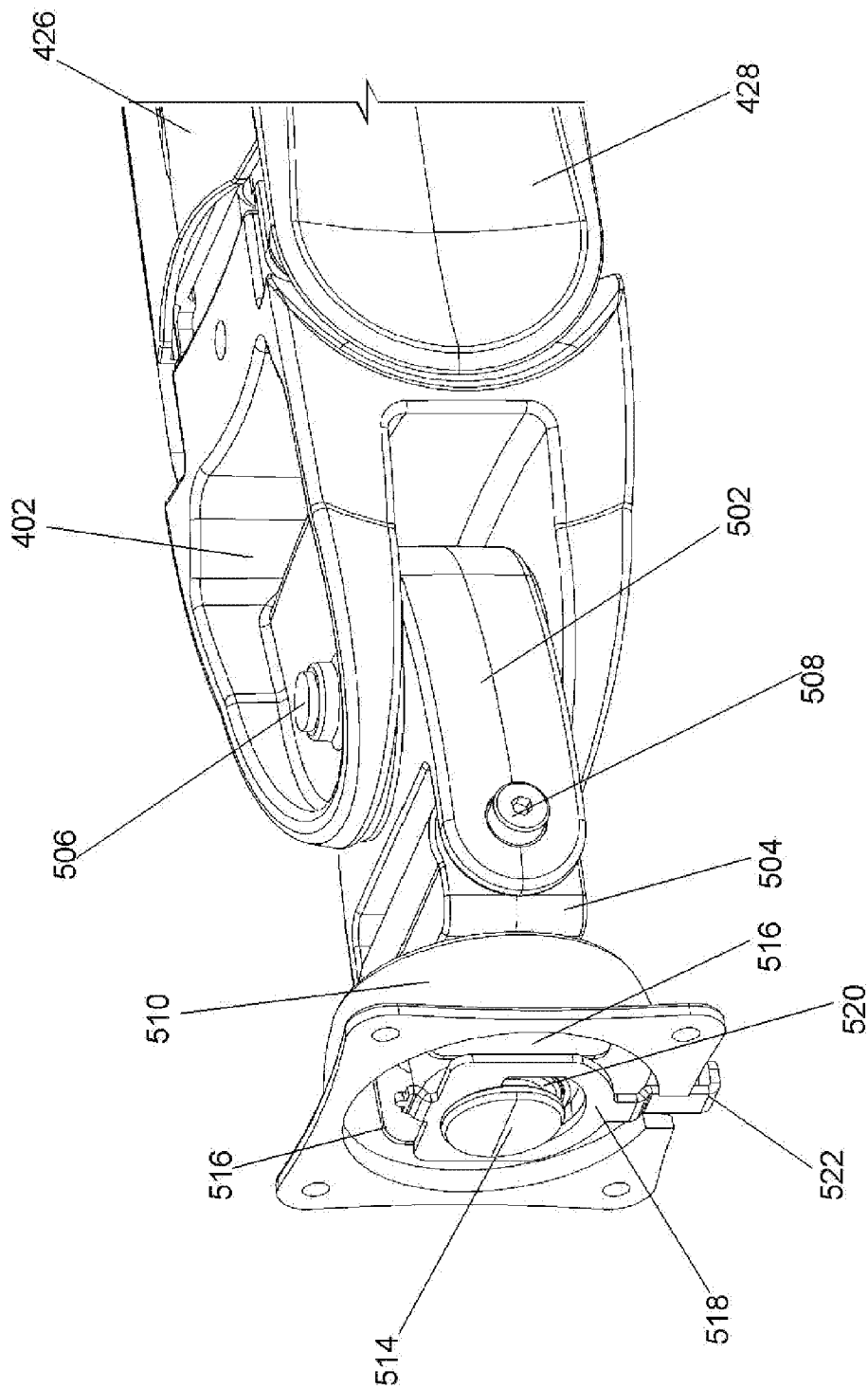
FIG. 18 is a front perspective view of the monitor mount shown in FIG. 1.
Figure 19:
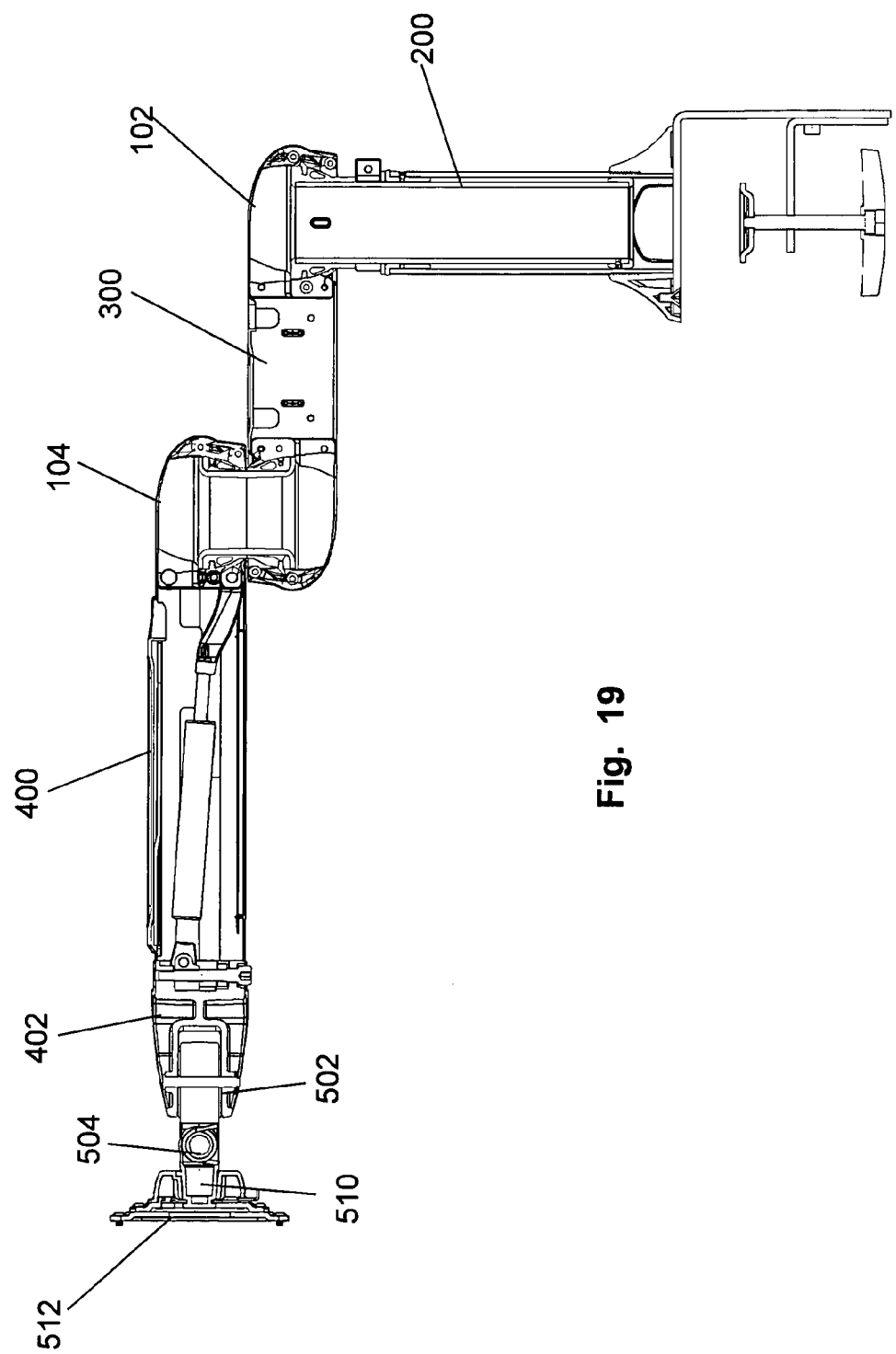
FIG. 19 is a cross sectional view of the monitor arm assembly of FIG. 1 showing an internal cable raceway.

Referring to FIG. 18, monitor head pivot 502 is pivotable about vertical pivot pin 506 and includes openings to accommodate a horizontal pivot pin 508 for pivotably attaching monitor yoke 504. Monitor yoke 504 is engageable with a monitor quick release receiver 510 that is, in turn, matable with an industry standard VESA hole pattern. The vertical and horizontal pivot pins 506 and 508 between VESA 512 and end link 402 allow both vertical and horizontal rotation of the VESA 512 relative to vertical member 400. Monitor quick release receiver 510 includes an opening that fits over monitor yoke projection 514. Monitor quick release receiver 510 also includes protruding tabs 516. Quick release clip 518 fits against protruding tabs 516 and is engageable with groove 520 in monitor yoke projection 514 to retain monitor quick release receiver 510 on yoke projection 514.

Quick release clip 518 allows easy and rapid installation and deinstallation of any standard VESA or other type of peripheral mount onto end link 402. The lower end 522 of quick release clip 518 may be pushed or pulled upwards to disengage clip 518 from the groove 520 at the end of the monitor yoke projection 514 and then pushed or pulled toward VESA 512 to disengage VESA 512 from monitor quick release receiver 510. Also, the quick release clip can engage the groove 520 such that VESA 512 and an attached monitor can be positioned in either landscape or portrait orientation.

Assembly

To assemble pole mount 200, collar 226 with quick-release lever 228 and washer 240 are positioned about inner tube 202 adjacent what will become the upper end of the tube. The mating flanges 234 of upper tube bearing 230 are fixed to inner tube 202 with set screw 238. Lower tube bearing 232 is fixed to tube 202 below upper tube bearing, using set screw 242. Outer tube 204 is slid onto the lower end of inner tube 202, and base 206 is screwed onto the lower end of outer tube 204. Set screws 216 are tightened to align the openings 212 in the base with indentations 214 in the outer tube. Knuckle inserts 244 and 246 are snapped into position about the upper end of inner tube 202, with slots 250 in tube 202 engaging tabs 248 protruding inward from the knuckle inserts 244 and 246.

For pole mount 260, assembly is the same as for pole mount 200, except that grommet base 262 is threaded onto upper screw threads 264 of outer tube 266. Grommet nut 268 may be threaded onto lower screw threads 270 to keep the parts together prior to installation.

To assemble nonarticulatable member 300, matable knuckle portions 312 and 314 are placed around knuckle inserts 244 and 246 and secured to each other with fasteners 324. Similarly, knuckle inserts 330 and 332 are placed around bearing sleeve 316, and a second set of matable knuckle portions 312 and 314 are placed around knuckle inserts 330 and 332 and secured with additional fasteners 324. Side plates 304 are then joined to matable knuckle portions 312 and 314 on each side of the knuckles using fasteners 306. Side covers 308 and top cover 310 are snapped into place.

To assemble vertical member 400, knuckle inserts 330 and 332 are placed around bearing sleeve 316, and matable knuckle portions 312 and 314 are placed around knuckle inserts 330 and 332 and secured with fasteners 324. The assembled knuckle may either be part of a knuckle joint 104 connected to an assembled nonarticulatable member 300, or the knuckle and sleeve may be clamped to a work bench. The knuckle is positioned with the pins 432 toward the person who is assembling the vertical member. Upper link 408 is pinned to matable knuckle portions 312 or 314, and then upper link 408 is pivoted out of the way, either upward or backward over the matable knuckle portions. The tension screw 436 is threaded into end link 402, with appropriate washers in place, until the threads extend slightly past nut 434. Then, the top pins 432 are inserted into end link 402. This step must be performed before elevator nut 438 is in place.

A spring subassembly is formed by threading the ends of gas shocks 416 onto clevis 410. Then eyelets 419 are threaded onto the distal ends of gas shocks 418. Elevator nut 438 is threaded between the two gas shock eyelets 419 to complete the spring sub-assembly.

Then tension adjust screw 436 is adjusted farther through end link 412 and into elevator nut 438 in the spring subassembly until the screw is bottomed, thereby tightening elevator nut 438 onto the flat spot of tension adjust screw 434. Elevator nut 438 should be positioned toward the top of the cavity inside the end link 402 to maximize the diagonal distance between the end link 402 and the clevis pin 412 which holds clevis 410 onto matable knuckle portions 312 and 314. The lower pins 432 are screwed into end link 402 to allow connection of the lower links 404 and 406.

Next, the lower pins 432 and lower links 404 and 406 are connected to the matable knuckle portions 312 ad 314, with spaces between lower links 404 and 406 and the outsides of the matable knuckle portions to allows clevis 410 to nest onto clevis pin 412. The other ends of the lower links 404 and 406 are attached to the lower pins 432 in the end link 402.

Suitable tools are used to compress the spring sub-assembly until it is short enough to fit into the space where it will be mounted in the vertical member 400. The open ends of clevis 410 are placed over and onto clevis pin 412 that was just placed through the matable knuckle portions 312 and 314. The pressure on the spring subassembly is then released, allowing the open ends of clevis 410 to bottom onto the clevis pin 412. Thus, the system is loaded with spring force, and the end link 402 now stretches away from the matable knuckle portions 312 and 314, with the spring force of the spring sub-assembly transmitted through the elevator nut 438 and tension screw 436. The lower links 404 and 406 now connect the end link 402 to the matable knuckle portions 312 and 314, with the spring sub-assembly forcing the top of the end link away from the top of the matable knuckle portions.

Next, the upper link 408, which is already connected to the matable knuckle portions 312 and 324, is connected to the end link 402. A screwdriver or other lever is inserted from below through the hole in end link 402 that accommodates pin 506. Torque is applied to the end link 402 with the screwdriver or lever to bring the top pins 432 of the end link close to the receiving holes in the upper link 408, and the top pins 432 are moved outward so they fit through the holes of the upper link 408. Suitable washers and clips are placed on the ends of the pins to secure the upper link 408 to end link 402, and the torque is released. The force of the spring sub-assembly pushes the vertical member 400 upward.

If used, wire flaps 424 are slid onto the horizontal portions 422 of the lower links 404 and 406. Alternatively, cable sheath 452 is placed between the spring subassembly and the lower link members. Pips 430 are screwed into the matable knuckle portions 312 and 314 and into end link 402. Side and top covers 428 and 426, respectively, are snapped into place over the pips 430.

To assemble monitor mount 500, monitor head pivot 502 is joined to yoke 504 with vertical pivot pin 406. Quick release receiver 510 is placed over monitor yoke projection 514 and secured in what will be either a portrait or landscape configuration by engaging quick release clip 518 in groove 520.

Finally, The monitor mount 500 is added to end link 402 with vertical pivot pin 506 and two large friction washers. Quick release clip 518 allows easy and rapid installation and de-installation of any standard VESA or other type of peripheral mount onto end link 402. The lower end 522 of quick release clip 518 may be pushed or pulled upwards to disengage clip 518 from the groove 520 at the end of the monitor yoke projection 514 and then pushed or pulled toward VESA 512 to disengage VESA 512 from monitor Quick release receiver 510.

In use, the monitor arm assembly is mounted onto a desk or table top by tightening the clamp of pole mount 200 about a desk or table top or by sandwiching the desk or table top between grommet base 262 and grommet nut 268. Alternatively, the pole mount can be secured to a vertical wall or furniture panel. A monitor or other peripheral device is attached to the monitor quick release receiver. The monitor power and/or data cables are pushed between the wire flaps of the vertical arm or into the cable sheath. The cable plugs are fed through the inside of the knuckle joint sleeve between the vertical member and the nonarticulatable member and then through the knuckle joint between the nonarticulatable member and the pole mount and then though the inside of the pole mount and through one of the openings in the pole mount. The cables are be pulled through the monitor arm assembly to eliminate slack, and the cables are then connected to appropriate outlets. The monitor arm can then be positioned to locate the monitor or other peripheral device as desired.

The cables should have a small amount of slack within the monitor arm to allow for positioning the arm as desired. The cables are concealed inside the internal raceway of the monitor arm assembly, enhancing the safety and attractiveness of the work environment. The monitor arm can be positioned and re-positioned as desired, without causing significant wear to the cables.

Monitor arm assembly parts such as knuckles 302, and 410, knuckle inserts 244, 246, 330 and 332, end link 402, and pole mount base 206, may be molded from a suitable material, such as aluminum, zinc, or magnesium. Lower links 404 and 406, upper link 408, plates 304, and quick release clip 518 may be formed from sheet metal. Top and side covers 308, 310, 426, and 428 may be formed by injection molding from plastic or any other suitable material with sufficient resilience for snap-fit mounting onto nonarticulatable member 300 and vertical member 400. Other components, such as screws, nuts, washers, spacers, e-clips, pivot pins, shock absorbers, etc. are commercially available. Inner tube 202 and outer tube 204 of pole mount 200 are machined, processed, or formed. The bearings 230 and 232 in the pole mount and the bearing sleeve 316 for the joint between the vertical and nonarticulatable members are preferably formed from nylon or another suitable material with the desired friction characteristics. The wire flaps and cable sheath are formed by extruding an elastomer, such as silicon, having the desired resiliency and durability.

An industry standard VESA 512 is shown in FIGS. 1, 11, and 16-22 is shown as an example of a suitable mounting means for a monitor. Other mounting means known in the art could be used to mount a monitor or other peripheral device onto an arm in accordance with the present invention.

Figure 9:
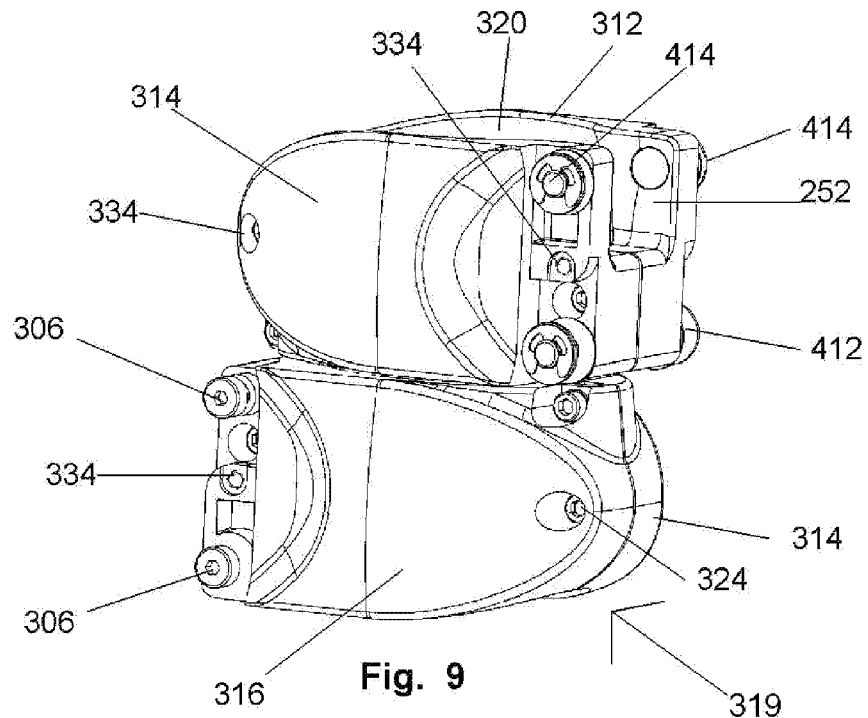
FIG. 9 is a front perspective view of another embodiment of a knuckle joint in accordance with the present invention.
Figure 10:
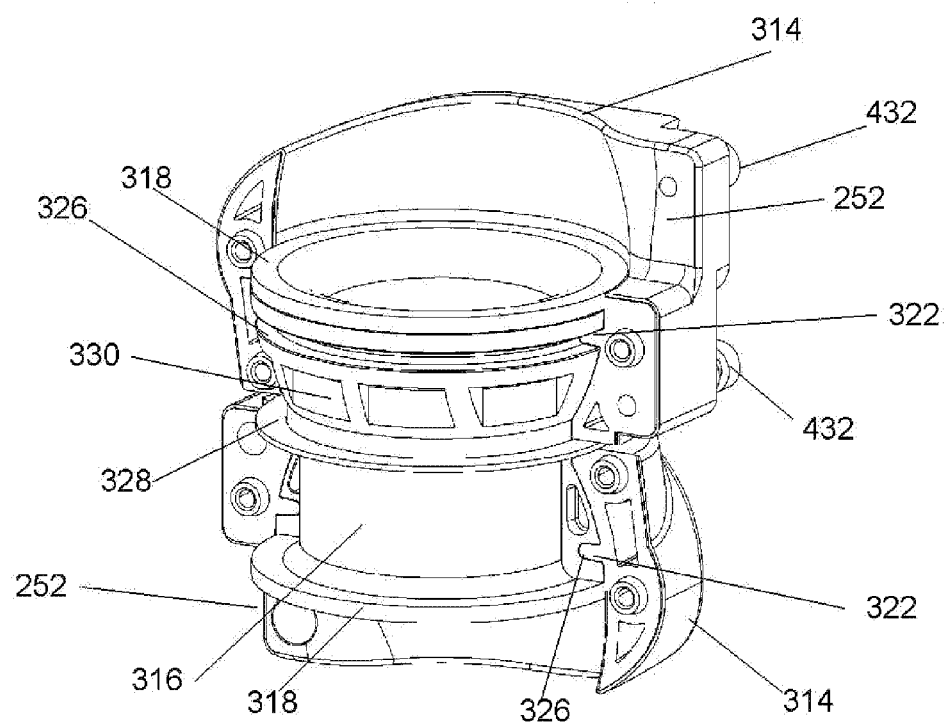
FIG. 10 is a front perspective view of the knuckle joint of FIG. 9, with some components removed.
Figure 11:
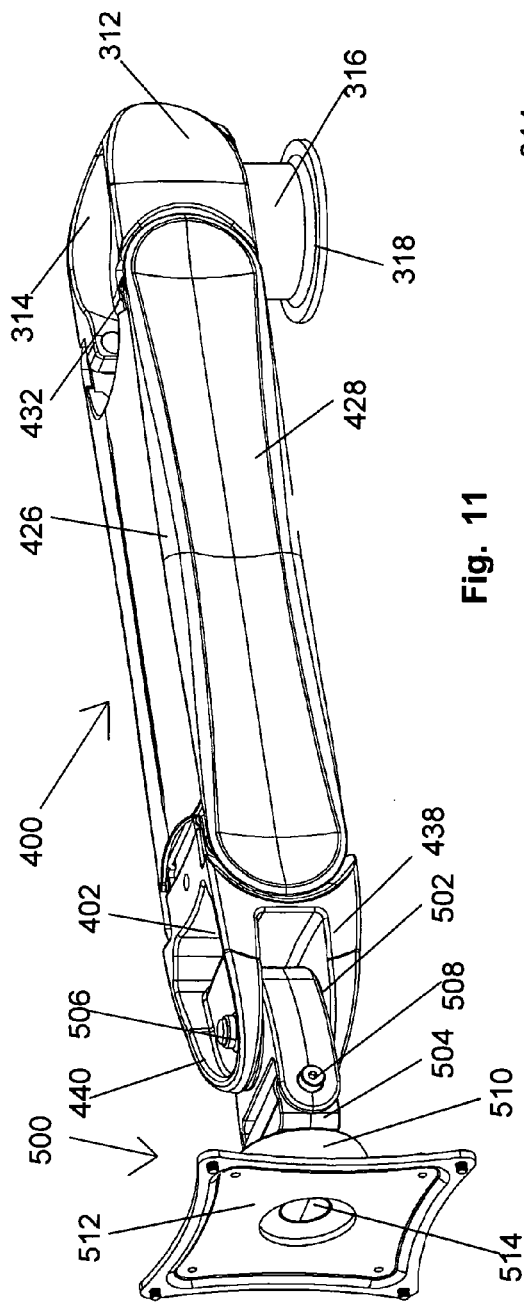
FIG. 11 is a front perspective view of one embodiment of a vertical member in accordance with the present invention.
Figure 20:
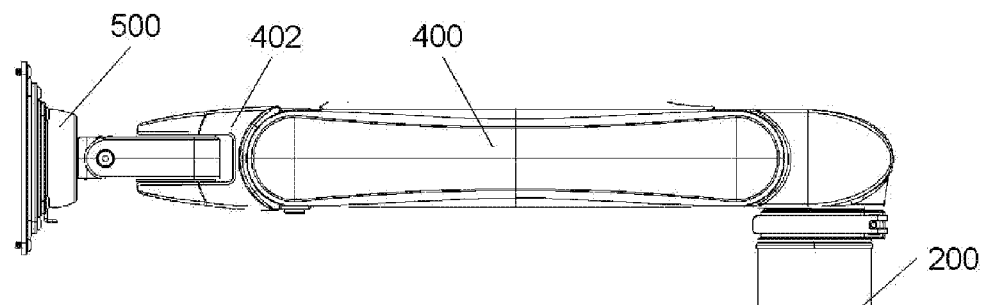
FIG. 20 is a side view of another embodiment of a monitor arm assembly in accordance with the present invention.
Figure 21:
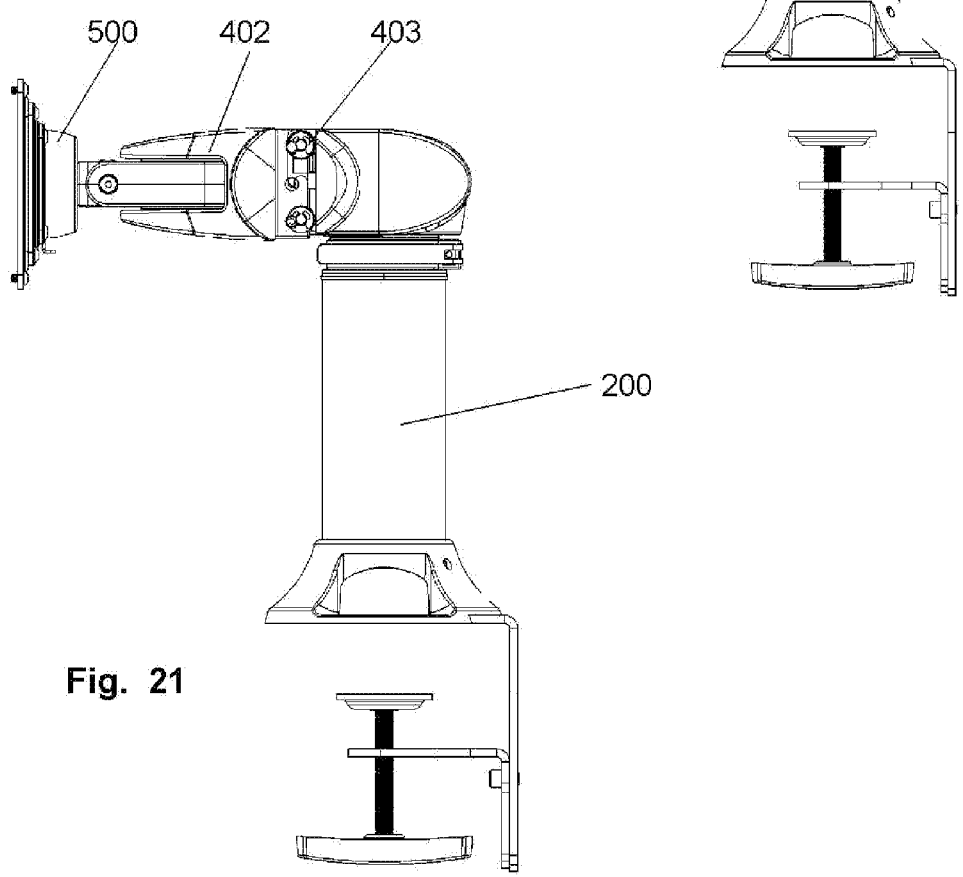
FIG. 21 is a side view of yet another embodiment of a monitor arm assembly in accordance with the present invention
Figure 22:
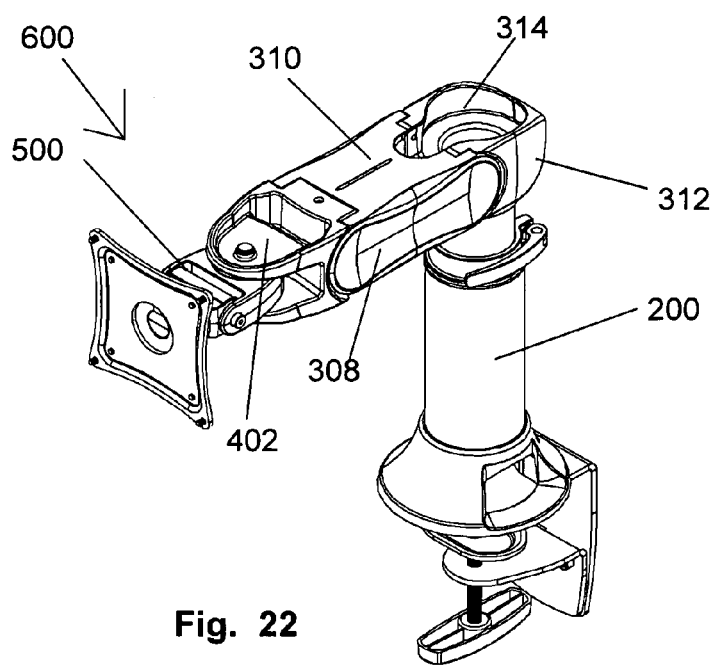
FIG. 22 is a perspective view of still another embodiment of a monitor arm assembly in accordance with the present invention.
Figure 23:
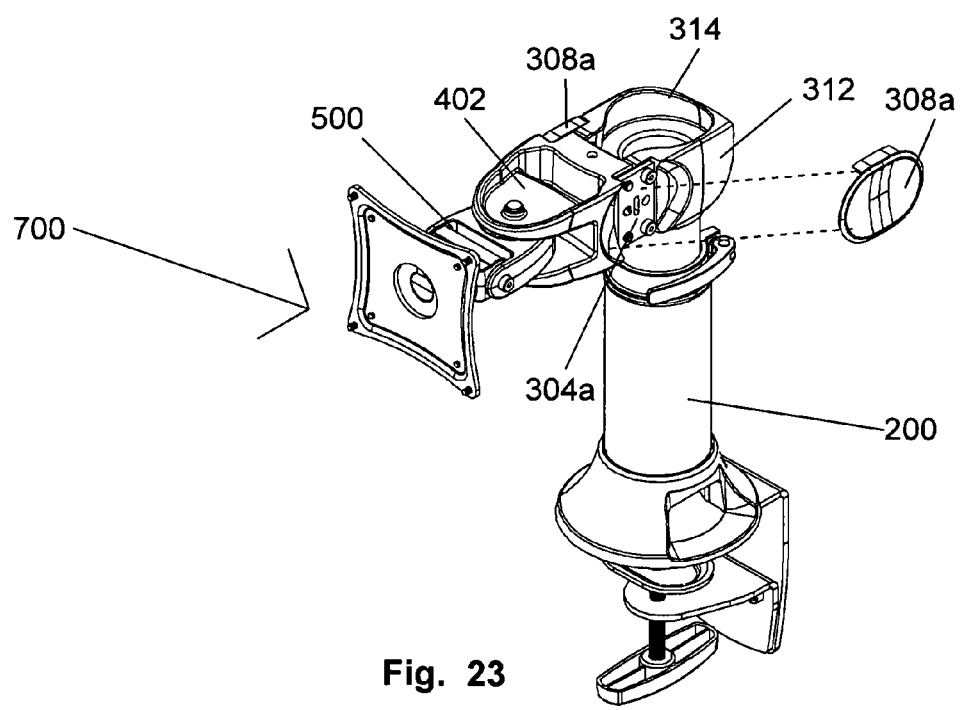
FIG. 23 is an exploded perspective view of another embodiment of a monitor arm in accordance with the present invention.
Figure 24:
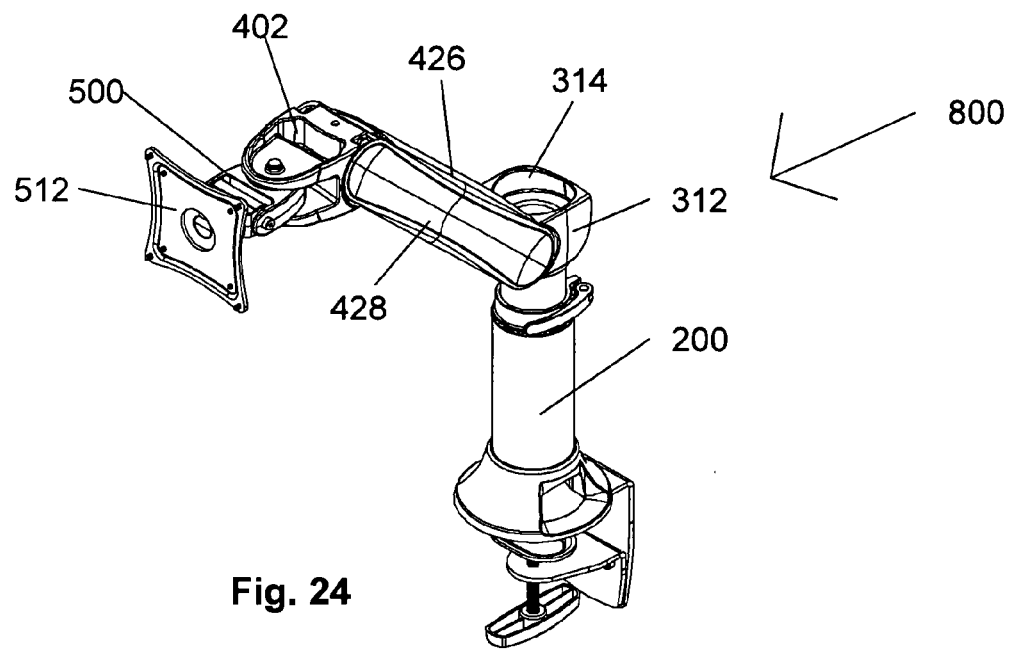
FIG. 24 is a perspective view of still another embodiment of a monitor arm assembly in accordance with the present invention.
Figure 25:
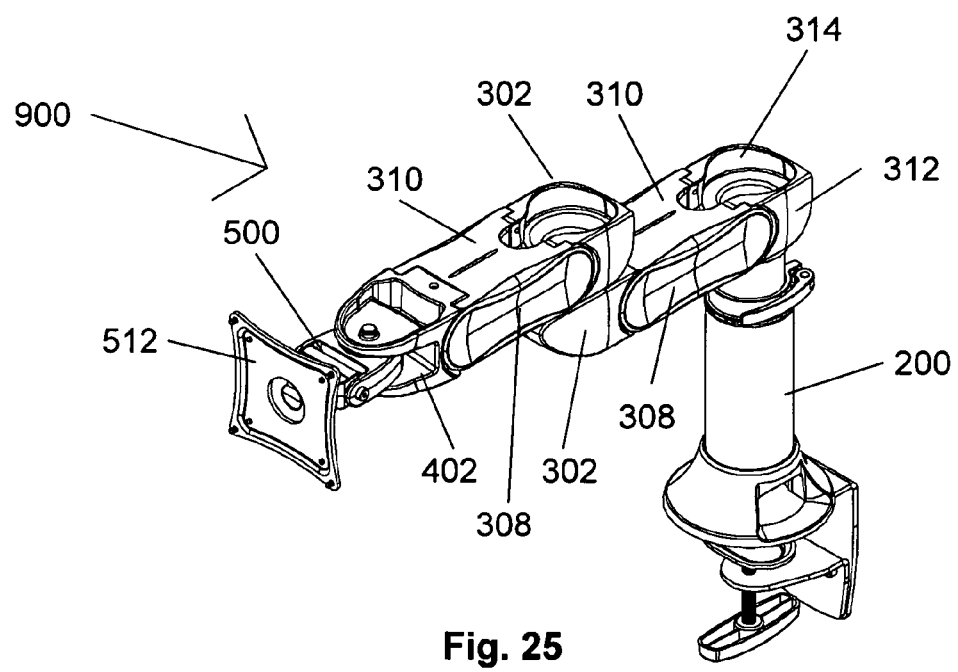
FIG. 25 is a perspective view of yet another embodiment of a monitor arm assembly in accordance with the present invention.

The components of a monitor arm assembly in accordance with the present invention are interchangeable. Vertical member 400 can be of any suitable length, with selection of appropriate lengths for shock absorbers, lower links 404 and 406, upper link 408, top cover 426, side covers 428, and wire flaps 424. The shock absorbers and links can be replaced with different length shock absorbers and links to obtain a vertical member with a different overall length. Similarly, nonarticulatable member 300 can be of any suitable length, with selection of appropriate lengths for plates 304, top cover 310, and side covers 308. The plates and covers can be replaced with plates and covers of a different length. Matable knuckle portions 312 and 314 can be used with either screws 306 and nuts, as shown in FIGS. 3, 4, 8, and 9 to mount plates 304 or with pins 414, washers, and e-clamps, as shown in FIGS. 9, 13, and 14 to mount lower links 404 and 406, clevis 410, and upper link 408, or with other suitable fasteners. Knuckles 302 and 410 can be mounted around either knuckle inserts 244 and 246 used with a pole mount, or knuckle inserts 330 and 332 used to connect the vertical and nonarticulatable members. Thus, vertical member 400 could be mounted onto a pole mount, as shown in FIG. 20, eliminating nonarticulatable member 300. Alternatively, as shown in FIG. 21, an end link 403 could include matable knuckle portions 313 and 315 to mount a monitor to the knuckle inserts 244 and 246 at the end of pole mount 200. In another embodiment, shown in FIG. 21, end link 402 could be mounted directly to joint 102, eliminating vertical member 400 and nonarticulatable member 300. Referring to FIG. 22, end link 402 can replace one knuckle 302 of a nonarticulatable arm, with no vertical arm present. nonarticulatable arm 300 may be very short, as shown in FIG. 23, by substituting plates 304a for the longer plates 304 shown in FIG. 7 and substituting shorter side covers 308a for the longer covers 308 in FIG. 7. Referring to FIG. 24, the nonarticulatable arm may be eliminated, with vertical arm 400 mounted onto knuckle inserts 244 and 246 on pole mount 200. It is also possible to replace vertical arm 400 with a second nonarticulatable arm, as shown in FIG. 25. Other combinations of components are possible, for example, mounting a vertical arm onto the pole mount and then joining a nonarticulatable arm at the distal end of the vertical arm.

The foregoing description is considered as illustrative only of the principles of the invention. Further, since numerous modifications and changes will readily occur to those skilled in the art, it is not desired to limit the invention to the exact construction and process shown and described above. Accordingly, all suitable modifications and equivalents may be resorted to falling within the scope of the invention.

What is claimed is:

1. A monitor support assembly having an internal cable raceway, said assembly comprising:
    means for mounting said assembly to a desk having an internal passage therethrough sized to accommodate at least one cable terminating in a connector or plug;
    pivoting means for mounting a monitor to said assembly, said pivoting means for adapted for horizontal and vertical pivotal motion of the monitor;
    quick-release means for mounting the monitor to said assembly in a plurality of orientations including landscape and portrait orientations; and
    a first rotatable joint between said means for mounting and said pivoting means, said joint including a passage through which at least one cable terminating in a connector or plug can pass without disassembly of said support assembly; wherein said first joint provides rotational motion about the cables;
    wherein said quick-release means comprises:
        a protruding portion matable with a monitor mounting portion, said protruding portion having a circumferential groove therein and an end; and
        a clip having an opening sized to fit over said end of said protruding portion and a narrower portion sized to engage with said protruding portion in said groove to maintain said monitor mounting portion in a mated configuration with said protruding portion, said quick-release clip also comprising a quick-release mechanism.

2. The monitor support assembly of claim 1, wherein said means for mounting comprises a base having means for protecting and managing at least one cable passing through said base and for securing said base against a surface selected from a wall, a furniture panel system, and an upper surface of a desk.

3. The monitor support assembly of claim 2, wherein;
    said means for protecting, managing, and securing is selected from clamps and wire grommets.

4. The monitor support assembly of claim 1, wherein said means for mounting comprises:
    inner and outer tubes sized for rotational and longitudinal movement of said inner tube within said outer tube;
    means for centralizing and retaining said inner tube within said outer tube; and
    additional quick-release means for locking and unlocking said inner tube in a desired position relative to said outer tube.

5. The monitor support assembly of claim 1, further comprising components selected from nonarticulatable members; vertical members; additional rotatable joints between said components, and combinations thereof; wherein said components are positioned between said first rotatable joint and said means for mounting and include a continuous internal passage sized such that at least one cable terminating in a connector or plug can be threaded therethrough.

6. The monitor support assembly of claim 5, wherein said assembly comprises a nonarticulatable member, said nonarticulatable member comprising a pair of opposing side plates, each plate having a first end joined to one of said rotatable joints and a second end joined to either a second rotatable joint or said quick-release means, wherein a portion of the internal passage is between said side plates.

7. The monitor support assembly of claim 6, wherein said nonarticulatable member further comprises side and top covers secured to said plates, said joints, said quick-release means, or a combination thereof.

8. The monitor support assembly of claim 6, wherein said plates are interchangeable with plates of different lengths to change the length of said nonarticulatable member.

9. The monitor support assembly of claim 1, wherein said protruding portion and said quick-release clip are engageable when said monitor mounting portion is rotated about said protruding portion into one of a plurality of positions.

10. The monitor support assembly of claim 9, wherein said positions are selected from positions corresponding to landscape and portrait orientations of a peripheral device.

11. A monitor support assembly having an internal cable raceway, said assembly comprising:
    means for mounting said assembly to a desk having an internal passage therethrough sized to accommodate at least one cable terminating in a connector or plug;
    pivoting means for mounting a monitor to said assembly, said pivoting means for adapted for horizontal and vertical pivotal motion of the monitor;
    quick-release means for mounting the monitor to said assembly in a plurality of orientations including landscape and portrait orientations;
    a first rotatable joint between said means for mounting and said pivoting means, said joint including a passage through which at least one cable terminating in a connector or plug can pass without disassembly of said support assembly; wherein said first joint provides rotational motion about the cables; and a vertical member that is pivotable horizontally about one of said joints and vertically relative to said means for mounting.

12. The monitor support assembly of claim 11, wherein said vertical member comprises upper and lower links pivotably connecting one of said joints and either another joint or said quick-release means and operative to provide vertical pivoting of said vertical member and said other joint or quick-release means relative to said one joint.

13. The monitor support assembly of claim 12, wherein upper and lower links are interchangeable with links of different lengths to change the length of said vertical member.

14. The monitor support assembly of claim 12, wherein said vertical member further comprises side and top covers secured to said side links, said joints, or a combination thereof.

15. The monitor support assembly of claim 14, wherein said vertical member further comprises shock absorbers and a tension adjustment mechanism for said shock absorbers.

16. A monitor support assembly having an internal cable raceway, said assembly comprising:
   means for mounting said assembly to a desk having an internal passage therethrough sized to accommodate at least one cable terminating in a connector or plug;
   pivoting means for mounting a monitor to said assembly, said pivoting means for adapted for horizontal and vertical pivotal motion of the monitor;
   quick-release means for mounting the monitor to said assembly in a plurality of orientations including landscape and portrait orientations; and
   a first rotatable joint between said means for mounting and said pivoting means, said joint including a passage through which at least one cable terminating in a connector or plug can pass without disassembly of said support assembly; wherein said first joint provides rotational motion about the cables;
   wherein said first joint is a knuckle joint, said knuckle joint comprising:
   an internal sleeve having an inner diameter sufficient to accommodate electrical and data cables, each cable terminating in a connector or plug;
   mating knuckle inserts disposed about said internal sleeve; and
   mating knuckle portions clamped about said knuckle inserts, said mated knuckle portions forming a recess above or below said internal sleeve with dimensions sufficient to accommodate electrical and data cables with plugs attached to the cables.

17. The monitor support assembly of claim 16, wherein:
   said internal sleeve is a telescopable tube of a means for mounting the monitor arm assembly to a desk; and
   said mating knuckle inserts comprise tabs engagable with openings in said tube.

18. The monitor support assembly of claim 16, wherein:
   said internal sleeve is a hollow bearing having a smooth external surface; and
   said knuckle inserts comprise smooth internal surfaces rotatable about the external surface of said sleeve.

19. The monitor support assembly of claim 16, further comprising:
   a second set of mating knuckle inserts disposed about said internal sleeve above said set of mating knuckle inserts; and
   a second set of mating knuckle portions clamped about said second set of knuckle inserts, wherein:
   said mating knuckle portions include a recess below said knuckle inserts and said sleeve;
   said second set of mating knuckle portions include a recess above said second set of knuckle inserts and said internal sleeve; and
   said sets of knuckle portions and said sleeve form a continuous conduit for the electrical and data cables.

20. The monitor support assembly of claim 19, further comprising a friction washer between said mating knuckle inserts and said second set of mating knuckle inserts.

21. A monitor support assembly having an internal cable raceway, said assembly comprising:
   means for mounting said assembly to a desk having an internal passage therethrough sized to accommodate at least one cable terminating in a connector or plug;
   pivoting means for mounting a monitor to said assembly, said pivoting means for adapted for horizontal and vertical pivotal motion of the monitor;
   quick-release means for mounting the monitor to said assembly in a plurality of orientations including landscape and portrait orientations;
   a first rotatable joint between said means for mounting and said pivoting means, said joint including a passage through which at least one cable terminating in a connector or plug can pass without disassembly of said support assembly; wherein said first joint provides rotational motion about the cables; and a component selected from nonarticulatable members, vertical members, and combinations thereof;
   wherein;
   said component comprises two end sections and side links fastened to said end sections and forming a portion of the cable raceway within a space between said side links and said end sections; and
   said side links have lengths selected to provide a predetermined length for said monitor arm.

22. The monitor support assembly of claim 21, wherein said side links comprise plates.

23. The monitor support assembly of claim 21, wherein:
   said side links are pivotally fastened to said end sections such that said end sections are pivotal in a vertical plane relative to said side links; and
   said monitor arm further comprises means for retaining said side links and said end sections in a selected position in the vertical plane.

24. The monitor support assembly of claim 21, wherein at least one of said end sections comprises a knuckle joint, said knuckle joint comprising:
   an internal sleeve having an inner diameter sufficient to accommodate electrical and data cables terminating in connectors or plugs;
   mating knuckle inserts disposed about said internal sleeve; and
   mating knuckle portions clamped about said knuckle inserts, said mated knuckle portions each including a recess above or below said internal sleeve with dimensions sufficient to accommodate electrical and data cables terminating in connectors or plugs.

25. The monitor support assembly of claim 21, wherein said quick-release means is mounted onto one of said end sections.

* * * * *